Patented July 4, 1950

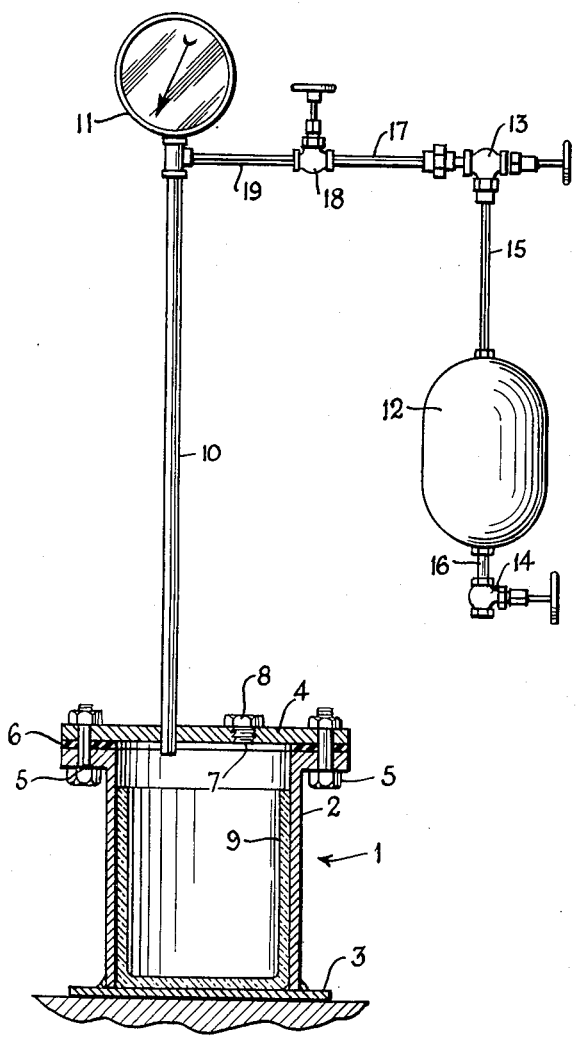

2,514,203

UNITED STATES PATENT OFFICE 2,514,203

VAPOR PHASE POLYMERIZATION OF BUTADIENE WITH SODIUM

Kenneth C. Eberly, Akron, Ohio, assignor to The Firestone Tire & Rubber Company, Akron, Ohio, a corporation of Ohio Application August 8, 1947, Serial No. 767,392

1 Claim. (Cl. 260—94.2)

This invention relates to the vapor phase polymerization of a volatile conjugated diene, and it relates especially to the production of improved modified polymers by carrying out the polymerization in the presence of improved modifying agents.

Sodium polymerization of butadiene in the liquid phase, also known as mass polymerization, has been studied extensively. However, little investigation of vapor phase polymerization of butadiene with sodium seems to have been made. Initial investigations by present applicant (patentee) disclosed that vapor phase polymerization of highly purified 1,3-butadiene with sodium consistently produced hard polymers showing little promise as replacements of the easily processed plastic natural rubbers. Similarly it has been found that vapor phase polymerizations of commercial samples of butadiene manufactured from alcohol also produced polymers of low plasticity, so long as the butadiene was not allowed to age for a substantial length of time.

Accordingly it is an object of the invention to provide a method of producing useful plastic polymers by the vapor phase polymerization of volatile conjugated dienes. It is also an object to provide a useful method of obtaining plastic diene polymers from conjugated dienes produced from different sources. Another object is to provide new and improved modifying agents for use in the vapor phase polymerization of dienes. Other objects will manifest in the description of the invention which follows, and in the accompanying single figure of drawing, in which there is shown small-scale apparatus for carrying out the method of the invention.

Referring to the drawing, there is shown a pressure reactor 1 having a wall portion 2 flanged at the top and welded at the bottom thereof to a plate 3. The top of the reactor is formed of a thick walled plate 4, removably secured to the flanged portion of wall 2 by suitable bolts 5, 5. A rubber gasket 6 is interposed between plate 5 and the flanged portion of wall 2 in order that the reactor may be adequately sealed. The top 4 of the reactor is provided with a threaded hole 7 and a suitable threaded plug 8 fitting therein. A two-liter beaker 9 with lip removed is provided on the inside of reactor 1. The reactor is connected through a pipe 10 to a pressure gage 11.

Also provided is a stainless steel container 12 capable of holding 1 kg. of liquid diene. Container 12 is connected to needle valves 13 and 14 by means of pipes 15 and 16, respectively. The container 12 is removably connected, near valve 13, to pipes 17 and 19, the latter pipe connected to pipe 10. An additional valve 18 is placed between pipes 17 and 19. Thus there is provided a container 12 for liquid diene provided with a gas-tight communication with the reactor 1.

PROCEDURE

A vapor phase polymerization of 1,3-butadiene with sodium is carried out in the above described apparatus in the following manner. Container 12 is disconnected from pipe 17 and charged with about 700 grams of butadiene. Container 12 is then connected to pipe 17. The apparatus is flushed with butadiene to expel air by removal of the plug 8 and opening valves 13 and 18. While a small current of butadiene gas escapes from the opening 7, a predetermined amount of sodium wire (or fine sodium sand) is quickly introduced through opening 7 into beaker 9 contained within the reactor. Plug 8 is then screwed into opening 7 and tightened to seal the system. At this point valves 13 and 18 are closed and the container 12 is removed for weighing in order to determine the residual amount of butadiene available for polymerization. Thereafter the reservoir is reconnected to the reactor and both valves 13 and 18 are opened.

After a variable induction period, polymerization proceeded. Ordinarily container 12 is maintained at ordinary room temperature of 25° C. throughout the polymerization. The pressure of the butadiene in the system, at this temperature, is fairly constant at 29–31 pounds per square inch (gage pressure). The end of the reaction is indicated by a drop in pressure, as indicated by gage 11, to atmospheric pressure. Often the polymerization is interrupted before butadiene is completely exhausted from container 12 in order to minimize the danger of air leaking into the reactor and causing undesirable changes in the butadiene polymer.

At the end of the run the polymerization time is noted and the remaining amount of unreacted butadiene (if any) is determined by closing valves 13 and 18, disconnecting container 12 and weighing same. Thereafter the reactor 1 is opened by removing top 4. The butadiene polymer is found to be in the form of a heavy coating upon the sodium catalyst contained in beaker 9.

The unstabilized polymer is very sensitive to cross-linking in the presence of air. A marked rised in gel content takes place in the course of a few hours after removal of the polymer from the reactor unless suitable precautions are taken to protect the polymer. Therefore the preferred procedure, utilized herein, is to wash the fresh polymer with water on a wash mill to remove unreactive sodium and also soluble sodium compounds. As soon as the washing is completed, 2% of phenyl-beta-naphthylamine is added as a stabilizer by milling it into the polymer. The polymer is then dried on a heated mill or in an oven at 70° C. Polymers treated in this manner can be stored for several days without noticeable changes.

POLYMERIZATION VARIABLES

The presence of certain impurities in the butadiene has been disclosed by previous investigations to be undesirable for polymerization with sodium. Water, carbon dioxide, carbon monoxide and many olefins seem to inhibit the polymerization, whether by catalytic effect or by mere dilution it is not certain. Also unblocked acetylenes have been indicated to interfere with sodium polymerizations.

A common impurity of aged butadiene, vinylcyclohexene, a dimer of butadiene, slows down or inhibits the polymerization, whether by its diluting effect or by means of a negative catalytic effect. Thus the present investigations were run on freshly prepared butadiene samples less than a week old. The various samples of butadiene were analyzed and found to assay, generally, 98% or better. As indicated above, it has been found that freshly prepared butadiene from ethyl alcohol, produced very stiff polymers in accordance with the method outlined above. On the contrary it was found that commercial samples of butadiene manufactured from petroleum, even though these samples assayed 98% or better, gave soft polymers after a very much longer reaction time.

SODIUM CATALYST

Generally in the polymerizations, reported later herein, the sodium catalyst was pressed through dies to form wires of 0.5 and 1.0 mm. in diameter. The resulting wire was pressed directly into reactor 1 through opening 7 in order to avoid air-tarnishing of the freshly formed surface of the wire. As indicated in the section above on polymerization procedure, the sodium wire is bathed by a current of butadiene escaping from the opening 7 during the introduction of the wire. In general it has been found polymerizations proceed substantially more rapidly with the use of the finer wire, because of the greater surface of catalyst exposed.

A series of polymerizations, run at different temperatures, discloses that at higher temperatures of 50–60° C. the plasticity increases, and the gel content and inherent viscosity decrease as the reaction temperature is increased; also the rate of polymerization at 50–60° C. is much lower than the rate at room temperature. In addition, polymerizations at room temperature, 25° C., produced polymers fo higher molecular weight having more rubbery properties.

MODIFIERS

The present observation is that very plastic, soft polymers are produced by the vapor phase polymerization of commercial butadiene produced from petroleum, and commercially available in the United States in the period 1942–3, lead to the production, in accordance with the present invention, of more useful polymers by blending such petroleum butadiene with butadiene manufactured from ethyl alcohol. A careful determination of the polymerizing properties of the petroleum butadiene should be made on each batch, in order to determine the amount to be blended with the butadiene from alcohol, in order to produce a polymer of the desired plasticity.

It should be pointed out that commercial butadienes produced from petroleum have more recently been available in the United States in a purified condition such that they behave in the process of the present invention in a manner more analogous to butadiene from alcohol.

It is understood that such purification has effected removal of certain diluents such as olefins, butanes, acetaldehydes, and possibly acetylenes, although it is not known for certain just what inhibitors were normally present in the petroleum butadienes giving very plastic polymers in the invention.

It has been found that alkyl halides, which are sufficiently volatile, are very potent modifiers in the vapor phase polymerization. Examples of suitable halide modifiers are ethyl chloride, methyl chloride, propyl and butyl chlorides, methyl, ethyl and propyl bromides, methyl and ethyl iodides, and lower alkyl fluorides such as methyl fluoride, ethyl fluoride, propyl fluoride and butyl fluoride. These modifying agents are extremely active in very low concentrations.

Other modifying agents, which are useful in the present procedure, although generally less effective than the alkyl halides, are volatile alkyl amines, volatile aldehydes, and acetone.

The amount of modifier employed varied according to the activity of the modifier and the polymerization characteristics of the butadiene, and the plasticity desired in the polymer. One of the most active modifiers, ethyl chloride, was found to stop completely a butadiene polymerization when it was used in a concentration of 0.5% in the butadiene. A concentration of 0.1% of ethyl chloride was found to be slightly more active as a modifier than 0.8% acetone. A comparison of the polymerization rates of four modifiers is set out in Table I.

TABLE I

*Rate of vapor phase polymerization of butadiene at 25° C.*

| Modifier | | | Hours to Form 500 g. Polymer | | |
|---|---|---|---|---|---|
| Type | B. P., °C. | Concentration, percent | 7.5 g. Na | 5.0 g. Na | 2.5 g. Na |
| Acetone | 56 | 0.2 | 90 | 96 | 163 |
| | | 0.5 | 77 | 117 | 229 |
| | | 0.8 | 75 | 107 | 151 |
| Acetaldehyde | 20 | 0.2 | 49 | 59 | 100 |
| | | 0.5 | 91 | 68 | 245 |
| | | 0.8 | 83 | 140 | 206 |
| Dimethylamine | 7 | 0.2 | 45 | 56 | 88 |
| | | 0.4 | 93 | 154 | 146 |
| | | 0.6 | 134 | 170 | 202 |
| Ethyl Chloride | 12 | 0.1 | 75 | 122 | 194 |
| | | 0.17 | 97 | 172 | 365 |

The molecular weight of the vapor phase polybutadiene, as indicated by inherent viscosity measurements, is reduced by these modifiers in the same order in which they retarded polymerization. In the 25° C. polymerizations, Table II, the use of a small amount of ethyl chloride causes a marked reduction in inherent viscosity. No measurable difference in viscosity was obtained in runs catalyzed in 2.5 or 7.5 grams of sodium.

TABLE II

*Inherent viscosity of modified vapor phase polybutadiene*

| Modifier | | Inherent Viscosity of Sol | | |
|---|---|---|---|---|
| Type | Concentration, Percent | 7.5 g. Na | 5.0 g. Na | 2.5 g. Na |
| Acetone | 0.2 | 3.64 | 4.54 | 3.66 |
|  | 0.5 | 3.70 | 4.47 | 4.82 |
|  | 0.8 | 3.64 | 3.47 | 3.90 |
| Acetaldehyde | 0.2 | 3.32 | 3.03 | 3.75 |
|  | 0.5 | 3.12 | 3.26 | 3.61 |
|  | 0.8 | 2.87 | 3.04 | 3.23 |
| Dimethylamine | 0.2 | 3.10 | 3.32 | 3.34 |
|  | 0.4 | 2.88 | 2.62 | 2.86 |
|  | 0.6 | 2.32 | 2.44 | 2.36 |
| Ethyl Chloride | 0.1 | 1.89 | 1.95 | 1.83 |
|  | 0.17 | 1.68 | 1.99 | 1.84 |

The plasticity of the modified polymers correlates well with the inherent viscosity. The values, plasticity and recovery of the 25° C. polymers catalyzed with 2.5 of sodium, are recorded in Table III. Along with the decreased plasticity, the lower recovery of the ethyl chloride modified polymer is an indication of a more plastic material.

These plasticity values were determined at 30° C. rather than at 100° C., otherwise the procedure was as described by Williams, Industrial and Engineering Chemistry, volume 16, page 362 (1924).

TABLE III

*Plasticity of modified vapor phase polybutadiene*

| Modifier | | Williams | |
|---|---|---|---|
| Type | Concentration, percent | Plasticity at 30° C. mm. | Recovery mm. |
| Acetone | 0.2 | 7.48 | 2.19 |
|  | 0.5 | 7.82 | 2.30 |
|  | 0.8 | 7.09 | 2.29 |
| Acetaldehyde | 0.2 | 7.25 | 2.24 |
|  | 0.5 | 6.74 | 1.81 |
|  | 0.8 | 6.41 | 1.63 |
| Dimethylamine | 0.2 | 7.01 | 1.98 |
|  | 0.04 | 6.76 | 2.02 |
|  | 0.6 | 4.97 | 1.68 |
| Ethyl Chloride | 0.1 | 4.29 | 0.93 |
|  | 0.17 | 4.02 | 0.81 |

PHYSICAL PROPERTIES OF VULCANIZATES

Certain polymers produced by the use of the four specific modifiers mentioned above were compounded for physical properties tests in accordance with the following formula:

| Material | Parts by Weight |
|---|---|
| Polymer | 100.0 |
| N-Cyclohexyl,2-benzothiazyl-sulfenamide | 1.2 |
| Zinc oxide | 5.0 |
| Sulfur | 2.0 |
| Stearic acid | 5.0 |
| Carbon black (EPC) | 50.0 |
| Phenyl-beta-naphthylamine | 2.0 |

Compositions in accordance with the above formula were cured for 20, 40 and 80 minutes at 280° F. All cures were tested for modulus, tensile and elongation properties. Additionally, samples of the 40-minute cure were tested by the ball rebound method at 100° C. The physical properties are set forth in Table IV.

TABLE IV

*Properties of vapor phase sodium polybutadiene vulcanizates*

| Inherent Viscosity | 1.0 | 1.89 | 2.36 | 3.59 | 4.56 |
|---|---|---|---|---|---|
| Modifier | None—50° C. | 0.1% Ethyl Chloride | 0.6% Dimethylamine | 0.5% Acetaldehyde | 1.0% Acetone |
| Modulus @ 300K: | | | | | |
| 20 Min. @ 280° F | 350 | 550 | 700 | 275 | 475 |
| 40 Min. @ 280° F | 700 | 825 | 875 | 1,050 | 1,075 |
| 80 Min. @ 280° F | 950 | 1,225 | 1,025 | 1,750 | 1,600 |
| Tensile @ Break: | | | | | |
| 20 Min. @ 280° F | 500 | 2,175 | 2,275 | 1,640 | 2,240 |
| 40 Min. @ 280° F | 850 | 2,475 | 2,300 | 1,900 | 1,700 |
| 80 Min. @ 280° F | 950 | 1,900 | 1,950 | 1,850 | 1,700 |
| Elongation: | | | | | |
| 20 Min. @ 280° F | 380 | 710 | 600 | 820 | 670 |
| 40 Min. @ 280° F | 340 | 590 | 530 | 420 | 410 |
| 80 Min. @ 280° F | 300 | 400 | 430 | 310 | 310 |
| Ball Rebound Per Cent @ 100° C.: 40 | 38 | 52 | 52 | 56 | 58 |

Thus it is seen that improved physical properties are imparted to polybutadiene produced by the vapor phase polymerization method, when modified in accordance with the invention. Similarly improved properties are obtained by the use of the other modifiers indicated above, especially the other alkyl halides. In addition the method of the invention may be applied to other volatile conjugated dienes, such as dimethylbutadiene, piperylene, etc.

The invention is limited only by the scope of the following claim.

What is claimed is:

Method of producing plastic polybutadiene which includes blending a slowly polymerizable petroleum butadiene with butadiene derived from alcohol, and polymerizing the mixture by the vapor phase method in the presence of sodium as a catalyst.

KENNETH C. EBERLY.

REFERENCES CITED

The following references are of record in the file of this patent:

UNITED STATES PATENTS

| Number | Name | Date |
|---|---|---|
| 1,921,867 | Ebert | Aug. 8, 1933 |

(Other references on following page)

UNITED STATES PATENTS

| Number | Name | Date |
|---|---|---|
| 1,953,468 | Ebert | Apr. 3, 1934 |

FOREIGN PATENTS

| Number | Country | Date |
|---|---|---|
| 280,959 | Germany | Dec. 1, 1914 |
| 326,869 | Great Britain | Mar. 20, 1930 |

OTHER REFERENCES

Abken and Medvedev: Zhur. Fiz. Khem., 13, 705 (1939), as reported in Talalay, "Synthetic Rubber From Alcohol," page 158, Interscience (1945).

Certificate of Correction

Patent No. 2,514,203                                      July 4, 1950

KENNETH C. EBERLY

It is hereby certified that error appears in the printed specification of the above numbered patent requiring correction as follows:

Column 3, line 3, for "rised" read *rise*; line 70, for "fo" read *of*; column 5, Table III, second column thereof, for "0.04" read *0.4*; columns 5 and 6, Table IV, first column thereof, for "Modulus @ 300K:" read *Modulus @ 300%:*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*